United States Patent Office 3,396,137
Patented Aug. 6, 1968

3,396,137
COMPOSITION COMPRISING AN ETHYLENE POLYMER AND AN N-SUBSTITUTED UNSATURATED CARBOXYLIC AMIDE
Willard H. Wharton, Lake Jackson, Tex., assignor to The Dow Chemical Company, Midland, Mich., a corporation of Delaware
No Drawing. Filed Mar. 5, 1965, Ser. No. 437,575
7 Claims. (Cl. 260—32.6)

ABSTRACT OF THE DISCLOSURE

Ethylene polymer compositions having substantially reduced film-to-film coefficient of friction and excellent receptivity to printing inks after surface treatment, are obtained by incorporating in the ethylene polymer an N-substituted unsaturated carboxylic amide having the formula

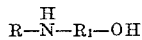

wherein R is an unsaturated aliphatic acyl radical having from 22 to 32 carbon atoms and $R_1$ is a divalent aliphatic radical having from 1 to 6 carbon atoms.

---

This invention relates to plastic compositions and more particularly to ethylene polymer compositions and articles made therefrom having improved properties with respect to the coefficient of friction and the adhesion of printing inks to the surface of the polymer.

It is well known to the art that ethylene polymers may be used for coatings and to make films for packagings and for other purposes. These films and coatings have good properties of moisture-proofness, mechanical strength and resistance to the action of many chemicals. However, one major drawback to films made from ethylene polymers such as polyethylene is that they have a high film-to-film coefficient of friction. This high coefficient of friction interferes with, and often prevents, the feeding of single sheets of films made from ethylene polymers to automatic packaging machinery.

Another disadvantage of these ethylene polymer films is the poor adhesion of printing inks to the relatively inert polymer surfaces. Many of the uses for ethylene polymers require printing of the plastic surface either for decorative or practical purposes as for example, to provide color, design or informative legend. A number of surface treating techniques have been developed to improve the receptivity of the polymer surface to printing inks and include chemical treatment with oxidizing agents such as chlorine and strong acids and electronic, or corona discharge treatment of the polymer surface.

In order to overcome the problem of high coefficient of friction a number of slip additives have been proposed by the art which may be admixed with the ethylene polymer before it is shaped. A disadvantage of some otherwise good slip additives that have been proposed is that they tend to exude to the surface where they depreciate the effect of surface treatments intended to improve the receptivity of the polymer surface to printing inks. Hence, there is a need in the art for a slip additive for ethylene polymers which does not deleteriously affect the printability of the treated polymer surface.

In accordance with the present invention ethylene polymer compositions having substantially reduced film-to-film coefficient of friction and excellent receptivity to printing inks after surface treatment are obtained by incorporating in the ethylene polymer an N-substituted unsaturated carboxylic amide having the formula

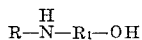

wherein R is an unsaturated aliphatic acyl radical having from 22 to 32 carbon atoms and $R_1$ is a divalent aliphatic radical having from 1 to 6 carbon atoms.

Specific examples of R in the above formula are the acyl residues of such unsaturated fatty acids as cis-13-docosenoic acid (erucic acid), trans-13-docosenoic acid (brassidic acid), 15-tetracosenoic acid (selacholeic acid), 17-hexacosenoic, 19-octacosenoic, and 21-triacontenoic acid.

Examples of N-substituted unsaturated carboxylic amides suitable for incorporation in ethylene polymer are N-(2-hydroxyethyl)-13-docosenamide,
N-(3-hydroxypropyl)-13-docosenamide,
N-(6-hydroxyhexyl)-13-docosenamide,
N-(2-hydroxyethyl)-15-tetracosenamide,
N-(3-hydroxypropyl)-15-tetracosenamide,
N-(6-hydroxyhexyl)-15-tetracosenamide,
N-(2-hydroxyethyl)-17-hexacosenamide,
N-(3-hydroxypropyl)-17-hexacosenamide,
N-(6-hydroxyhexyl)-17-hexacosenamide,
N-(2-hydroxyethyl)-19-octacosenamide,
N(3-hydroxypropyl)-19-octacosenamide,
N-(6-hydroxyhexyl-19-octacosenamide,
N-(2-hydroxyethyl)-21-triacontenamide,
N-(3-hydroxypropyl)-21-triacontenamide,
N-(6-hydroxyhexyl)-21-triacontenamide.

The ethylene polymers used in the practice of this invention include polyethylene itself, copolymers of ethylene and aliphatic, ethylenically unsaturated carboxylic esters and ethylene terpolymers comprised of ethylene, an aliphatic, ethylenically unsaturated carboxylic ester and an ethylenically unsaturated hydrocarbon. Illustrative of the aliphatic, ethylenically unsaturated carboxylic esters which may be copolymerized with ethylene are the acrylic and methacrylic esters and the vinyl esters of monobasic alkanoic acids. Specific examples of such esters are methyl acrylate, ethyl acrylate, n-propyl acrylate, isopropyl acrylate, n-butyl acrylate, isobutyl acrylate, n-hexyl acrylate, cyclohexyl acrylate, 2-ethylhexyl acrylate, methyl methacrylate, ethyl methacrylate, n-propyl methacrylate, isopropyl methacrylate, n-butyl methacrylate, isobutyl methacrylate, 2-ethylhexyl methacrylate, vinyl formate, vinyl acetate, vinyl propionate, vinyl n-butyrate, vinyl isobutyrate, and the like.

Illustrative examples of the ethylenically unsaturated hydrocarbons which may be used to form the ethylene terpolymers include propylene, butene-1, pentene-1, and the like. Especially useful terpolymers are terpolymers containing about 0.5 percent to about 20 percent by weight of an ethylenically unsaturated monocarboxylic acid ester such as vinyl acetate, up to about 2 percent of another copolymerizable ethylenically unsaturated hydrocarbon, especially propylene, the balance of the terpolymer composition, i.e. from about 80 percent to about 99 percent by weight, of ethylene, all percentages being based on the total copolymer weight. The terpolymers and their method of preparation are more fully described in copending patent application of Hardy E. Ross and Willard H. Wharton, Ser. No. 349,742, filed Mar. 5, 1964 now Patent 3,326,840, issued June 20, 1967.

In general the proportion of the N-substituted unsaturated carboxylic amide incorporated in the ethylene polymer composition is within the range of from about 0.05 percent to about 0.5 percent, preferably from about 0.10 to 0.30 percent by weight based on the polymer weight.

While compositions of the present invention consist substantially of ethylene polymers and the N-substituted unsaturated carboxylic amides, small amounts of conventional additives and modifiers useful in the plastics art, such as antioxidants, stabilizers, antistatic agents, carbon black, pigments, colorants, high melting waxes, and the like, can be blended therewith.

The compositions of the present invention comprising ethylene polymers and the N-substituted unsaturated carboxylic amides may be converted to film by well-known extrusion techniques such as by use of a circular die and appropriate conditions to produce blown tubing or by a flat-die process.

The compositions of this invention may be prepared by any method suitable for insuring a substantially uniform mixture of the components such as by mixing the ethylene polymer and the other ingredients at a temperature at which the polymer is plastic in a Banbury mixer, a conventional rubber mill, heated rollers, or an extruder screw, and the like. The N-substituted unsaturated carboxylic amide may be blended in the form of a solid or a liquid (depending upon the temperature), a solution in an inert solvent, or a slurry in a non-solvent.

To illustrate more fully the practice of this invention to those skilled in the art, the following examples are given, without any limitations being intended thereby. In the examples all parts and percentages are by weight unless otherwise specified.

Example I

A polyethylene resin having a density of 0.924 and a melt index of 2 was compounded in a plastics extruder with 2,000 parts per million (based on the weight of the polyethylene) of N-(2-hydroxyethyl)-cis-13-docosenamide.

The resultant composition was fabricated into 1.0 mil film by a conventional blown film extrusion process. For comparative purposes, control films were prepared in a similar manner with the exception that 2,000 parts per million each of oleamide and N-(2-hydroxyethyl) octadecanamide were incorporated in separate polyethylene film materials.

The films were the electrostatically treated with a Lepel Model HFSG-2 treater, manufactured by the Lepel Laboratories, Inc. In using this treater, the films to be treated are passed over a metal ground roll with a high tension treater bar positioned over the roll with about 100 mils gap so that the film passes between bar and roll. A high voltage potential is established between the bar and roll on the order of 10,000 volts or higher depending upon the degree of treatment needed. The passage of current (on the order of several milliamps) causes a corona effect in the air space next to the film surface. The corona discharge treats the film in a manner so that the film surface will accept inks and develop high strength bonds between film surface and ink.

The coefficient of friction of the films was determined in accordance with ASTM test designation D-1894.

The printability of the film, i.e., the strength of the adhesive bond between a printing ink and the treated polyethylene surface, was evaluated by first spreading standard polyethylene printing ink (Interchemical Corporation Flexotuf ink NO. CIG-0187-opaque blue) on the surface of the polymer film allowing the ink to dry and then applying a strip of cellulose pressure sensitive adhesive tape to the printed ink surface, pressing the tape to the surface with uniform finger pressure and stripping the tape from the film surface. The ink adhesion is visually judged from the relative amount of ink that remains on the film surface compared to the amount stripped off with the tape. On this basis the printability of the films was rated as good, poor, or unsatisfactory, good meaning that ink adhesion was 100 percent (none came off with the tape), poor meaning that ink adhesion was 90 to 99 percent (1 to 10 percent came off with the tape) and unsatisfactory meaning that ink adhesion was less than 90 percent (more than 10 percent came off with the tape).

The coefficient of friction and the printability of the polyethylene films are summarized in Table I below.

TABLE I

| Sample No. | Additive | Coefficient of Friction | Printability |
|---|---|---|---|
| 1 | N-(2-hydroxyethyl)-cis-13-docosenamide. | 0.276 | Good. |
| C$_1$ | Oleamide | 0.309 | Poor-to-good. |
| C$_2$ | N-(2-hydroxyethyl)-octadecanamide. | 0.423 | Unsatisfactory. |

In general, investigations with additive substances for reducing the coefficient of friction of ethylene polymers have shown that such additives are generally detrimental to the ink receptivity of the electrostatically treated surface. However, as is shown by the foregoing data, the incorporation of an N-substituted unsaturated carboxylic amide such as N-(2-hydroxyethyl)-cis-13-docosenamide in polyethylene in accordance with the present invention (sample 1 of Table I), not only substantially reduces the coefficient of friction of the polymer, but to a substantial degree has no detrimental effect on the ink receptivity of the electrostatically treated polymer surface and especially when compared to polyethylene samples containing equivalent amounts of slip agents outside the scope of the present invention (sample numbers C$_1$ and C$_2$ of Table I).

Additionally it was noted that the film sample containing the N-(2-hydroxyethyl-cis-13-docosenamide developed good slip properties when slipped between thumb and finger within 30 seconds after the fabrication (i.e. solidification of the polymer melt) whereas the comparative films did not develop any degree of film to film slip within the same time period.

Example 2

A terpolymer of 5 percent by weight of vinyl acetate, 1.5 percent by weight of propylene and the balance, 93.5 percent, of ethylene was compounded in a 2½ inch extruder with 3,000 parts per million (based on the weight of the copolymer) of N-(2-hydroxyethyl)-cis-13-docosenamide. The resultant compositions were fabricated into 1.5 mil film by a conventional blown film extrusion process.

For comparative purposes, control films were prepared in a similar manner with the exception that 3,000 parts per million each of oleamide, and N-(2-hydroxyethyl) octadecanamide were incorporated in the terpolymer. The coefficient of friction and printability of the films were determined in the manner described in Example I with the results being shown in Table II.

TABLE II

| Sample No. | Additive | Coefficient of Friction | Printability |
|---|---|---|---|
| 1 | N-(2-hydroxyethyl)-cis-13-docosenamide. | 0.259 | Good. |
| C$_1$ | Oleamide | 0.423 | Poor. |
| C$_2$ | N-(2-hydroxyethyl)-octadecanamide. | 0.407 | Unsatisfactory. |

By referring to Table II it is at once apparent the ethylene terpolymer compositions containing N-(2-hydroxyethyl)-cis-13-docosenamide (Sample No. 1) show a substantial decrease in the coefficient of friction without any significant decrease in printability over ethylene terpolymer compositions containing equivalent amounts of slip additives outside the scope of the present invention (sample numbers C$_1$ and C$_2$ of Table II).

Results similar to the foregoing may also be obtained when another of the other mentioned varieties of N-substituted unsaturated amides are utilized in a similar manner in place of the N-(2-hydroxyethyl)-cis-13-docosenamide used in the above examples.

What is claimed is:

1. An ethylene polymer selected from the group consisting of polyethylene, copolymers of ethylene, and mono-ethylenically unsaturated carboxylic esters, and terpolymers of ethylene, mono-ethylenically unsaturated carboxylic esters, and mono-ethylenically unsaturated hydrocarbons, having incorporated therein about 0.05 percent to about 0.5 percent of N-(2-hydroxyethyl)-cis-13-docosenamide.

2. The composition of claim 1 wherein the ethylene polymer is polyethylene.

3. The composition of claim 1 wherein the ethylene polymer is a terpolymer of ethylene, propylene and vinyl acetate.

4. A terpolymer of ethylene, propylene and vinyl acetate having incorporated therein from about 0.10 percent to about 0.30 percent by weight based on the weight of the terpolymer of N-(2-hydroxyethyl)-cis-13-docosenamide.

5. Polyethylene having incorporated therein from about 0.10 percent to about 0.30 percent by weight based on the weight of the polyethylene of N-(2-hydroxyethyl)-cis-13-docosenamide.

6. The composition of claim 4 wherein the N-(2-hydroxyethyl)-cis-13-docosenamide is used in an amount of 0.3 percent.

7. The composition of claim 5 wherein the N-(2-hydroxyethyl)-cis-13-docosenamide is used in an amount of 0.2 percent.

References Cited

UNITED STATES PATENTS

| 2,938,879 | 5/1960 | Mock et al. | 260—32.6 |
| 2,956,979 | 10/1960 | Rowland et al. | 260—32.6 |
| 2,991,265 | 7/1961 | Clark et al. | 260—32.6 |
| 3,197,425 | 7/1965 | Konig et al. | 260—32.6 |

FOREIGN PATENTS

| 867,280 | 5/1961 | Great Britain. |

MORRIS LIEBMAN, *Primary Examiner.*

B. A. AMERNICK, *Assistant Examiner.*